US010924941B2

(12) United States Patent
Ju et al.

(10) Patent No.: US 10,924,941 B2
(45) Date of Patent: Feb. 16, 2021

(54) ROBOT OPERATING METHOD AND ROBOT OPERATING SYSTEM

(71) Applicant: HANWHA DEFENSE CO., LTD., Changwon-si (KR)

(72) Inventors: Jae Hyuk Ju, Changwon-si (KR); Jik Han Jung, Changwon-si (KR)

(73) Assignee: HANWHA DEFENSE CO., LTD., Changwon-si (KR)

(*) Notice: Subject to any disclaimer, the term of this patent is extended or adjusted under 35 U.S.C. 154(b) by 0 days.

(21) Appl. No.: 16/470,308

(22) PCT Filed: Feb. 17, 2017

(86) PCT No.: PCT/KR2017/001745
§ 371 (c)(1),
(2) Date: Jun. 17, 2019

(87) PCT Pub. No.: WO2018/128215
PCT Pub. Date: Jul. 12, 2018

(65) Prior Publication Data
US 2019/0335341 A1    Oct. 31, 2019

(30) Foreign Application Priority Data
Jan. 3, 2017   (KR) .................. 10-2017-0000795

(51) Int. Cl.
*H04W 16/26* (2009.01)
*H04B 7/155* (2006.01)
*H04W 88/04* (2009.01)

(52) U.S. Cl.
CPC ............ *H04W 16/26* (2013.01); *H04B 7/155* (2013.01); *H04W 88/04* (2013.01)

(58) Field of Classification Search
CPC ............................. H04W 16/26; H04B 7/155
See application file for complete search history.

(56) References Cited

U.S. PATENT DOCUMENTS 10,243,604 B2 * 3/2019 Ross .................... H04B 1/3822
2010/0318242 A1  12/2010 Jacobsen et al.
(Continued)

FOREIGN PATENT DOCUMENTS

JP    2005-025516 A    1/2005
JP    2005-086262 A    3/2005
(Continued)

OTHER PUBLICATIONS

Search report dated Sep. 22, 2017, issued by the International Searching Authority in International Application No. PCT/KR2017/001745 (PCT/ISA/210).
(Continued)

*Primary Examiner* — Ronald B Abelson
(74) *Attorney, Agent, or Firm* — Sughrue Mion, PLLC (57) ABSTRACT

Provided is a robot operating method in which a host device operates a task robot which performs a task by performing wireless communication with the host device in a designated task execution region. At least one mobile relay robot that relays communication between the host device and the task robot is put in between the host device and the task robot. The number of mobile relay robots to be put in between the host device and the task robot is set according to a longest distance between the host device and the task robot and an environment of the task execution region.

2 Claims, 13 Drawing Sheets

(56) References Cited

U.S. PATENT DOCUMENTS

| | | | |
|---|---|---|---|
| 2011/0267982 A1 | 11/2011 | Zhang et al. | |
| 2013/0123981 A1 | 5/2013 | Lee et al. | |
| 2016/0121232 A1 | 5/2016 | Ji et al. | |
| 2016/0252910 A1 | 9/2016 | Jacobsen et al. | |
| 2018/0157260 A1* | 6/2018 | Hayama | G05D 1/02 |

FOREIGN PATENT DOCUMENTS

| | | |
|---|---|---|
| JP | 2014-131292 A | 7/2014 |
| KR | 10-2011-0029996 A | 3/2011 |
| KR | 10-2012-0116178 A | 10/2012 |
| KR | 10-2013-0051679 A | 5/2013 |
| KR | 10-1309527 B1 | 9/2013 |
| KR | 10-1331832 B1 | 11/2013 |
| KR | 10-1388206 B1 | 4/2014 |

OTHER PUBLICATIONS

Written Opinion dated Sep. 22, 2017, issued by the International Searching Authority in International Application No. PCT/KR2017/001745 (PCT/ISA/237).

* cited by examiner

| TASK EXECUTION REGION | POSITION INFORMATION | LONGEST DISTANCE | TOTAL ENVIRONMENT INFORMATION | NUMBER OF ROBOTS |
|---|---|---|---|---|
| 1 | ... | ... | ... | ... |
| 2 | ... | ... | ... | ... |
| ⋮ | ⋮ | ⋮ | ⋮ | ⋮ |

701a — TASK EXECUTION REGION
701b — POSITION INFORMATION
701c — LONGEST DISTANCE
701d — TOTAL ENVIRONMENT INFORMATION
701e — NUMBER OF ROBOTS
701

| APPLIED RATIO (%) | HEIGHT (m) | SEASON | WEATHER | WHETHER LOS IS APPLIED |
|---|---|---|---|---|
| 100 | H ≤ 10 | WINTER | CLEAR | $R_I$ ≤ 10 |
| 95 | 10 < H ≤ 15 | | | |
| 90 | 15 < H ≤ 20 | SPRING, AUTUMN | FOGGY | |
| 85 | 20 < H ≤ 25 | | RAINY | |
| 80 | 25 < H | SUMMER | SNOWY | |
| 75 | | | | |
| 70 | | | | $R_I$ > LOS |

$$R_E = R_I \cdot K_H \cdot K_S \cdot K_W \cdot K_L$$

ROBOT OPERATING METHOD AND ROBOT OPERATING SYSTEM

TECHNICAL FIELD

The present disclosure relates to a robot operating method and a robot operating system, and more particularly, to a robot operating method in which a task robot performing a task while performing wireless communication with a host device in a designated task execution region is operated by the host device, and a robot operating system adopting the robot operating method.

BACKGROUND ART

Figure 1:
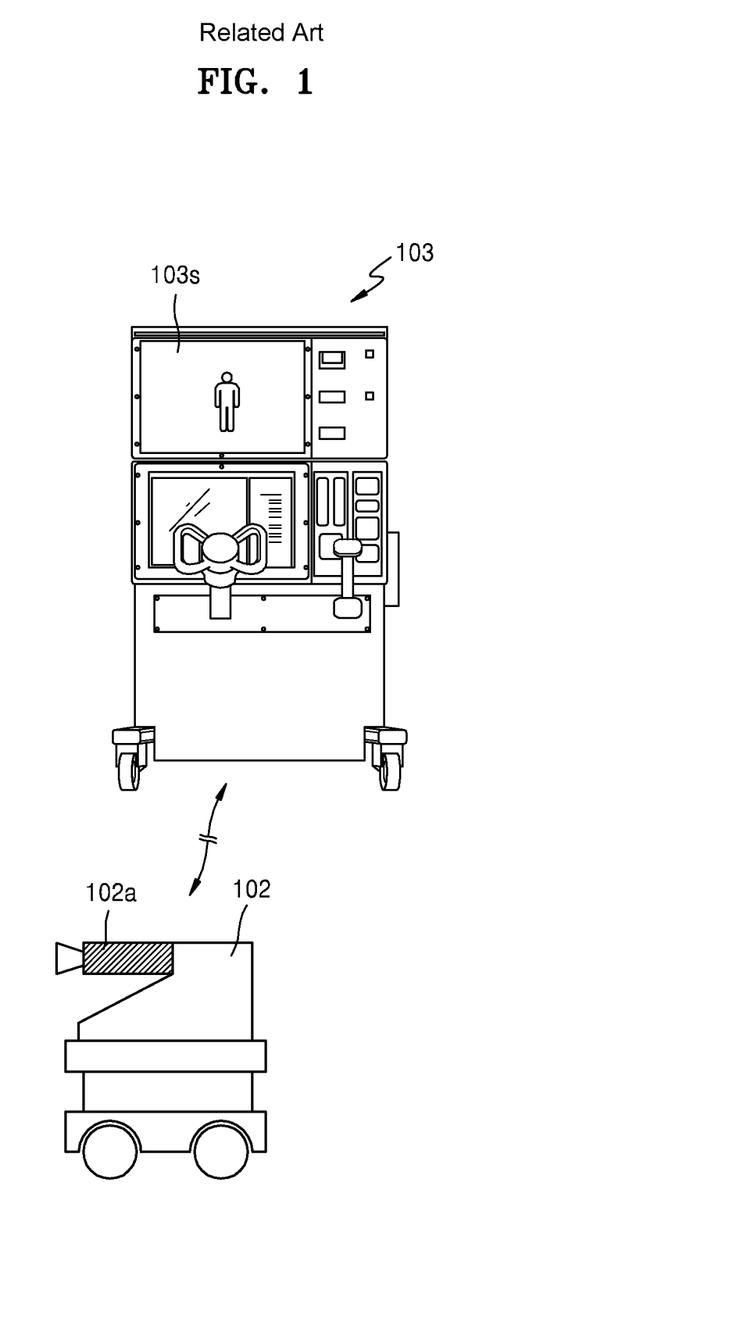
FIG. 1 is a diagram for describing a robot operating system including a host device and a task robot.

FIG. 1 is a diagram for explaining a robot operating system including a host device 103 and a task robot 102. In FIG. 1, reference numeral 103s denotes a display panel, and reference numeral 102a denotes a camera.

Referring to FIG. 1, the task robot 102 performs a task while performing wireless communication with the host device 103 in a designated task execution region.

In most cases, a longest distance between the host device 103 and the task robot 102 is longer than an effective communication radius of the task robot 102. In this case, in the related art, installers have installed repeaters by using instruments such as a tripod. Thus, robot operating systems according to the related art have the following problems.

First, it is difficult to find appropriate installation positions by repeated communication tests when installing the repeaters in a new task execution region.

Secondly, as the repeaters are not installed at appropriate positions, communication between the host device 103 and the task robot 102 may be disconnected.

Thirdly, when a travel path of the task robot 102 is changed within a same task execution region, there is the inconvenience of having to reinstall the repeaters.

The problems of the background art described above were held by the inventor to derive embodiments of the present disclosure or information acquired during the process of deriving the same, and is not necessarily a technology known to the general public prior to the filing of the present disclosure.

DESCRIPTION OF EMBODIMENTS

Technical Problem

Provided are a robot operating method and a robot operating system, whereby the problems of difficulty in installing a repeater in a robot operating system according to the related art and disconnection of communication according to the related art may be resolved.

Solution to Problem

According to an aspect of the present disclosure, there is provided a robot operating method in which a task robot performing a task while performing wireless communication with a host device in a designated task execution region is operated by the host device.

Here, at least one mobile relay robot that relays communication between the host device and the task robot is put in between the host device and the task robot. The number of mobile relay robots to be put in between the host device and the task robot is set according to a longest distance between the host device and the task robot and an environment of the task execution region.

A system according to an embodiment of the present disclosure includes a host device, a task robot, and at least one mobile relay robot.

The task robot performs a task while performing wireless communication with the host device in a designated task execution region.

The at least one mobile relay robot is put in between the host device and the task robot to relay communication between the host device and the task robot.

The number of mobile relay robots to be put in between the host device and the task robot is set based on a longest distance between the host device and the task robot and an environment of the task execution region.

Advantageous Effects of Disclosure

According to the robot operating method and the robot operating system of the present embodiment, the mobile relay robot performs a function of a repeater according to the related art. Thus, following effects are obtained.

First, installation of a repeater is completed by the host device as the host device controls the at least one mobile relay robot, and thus, the repeater may be installed conveniently.

Secondly, as the at least one mobile relay robot may be installed at an appropriate position, communication between the host device and the task robot is not disconnected.

Thirdly, when a travel path of the task robot is changed within a same task execution region, the repeater may be conveniently reinstalled by moving a position of the at least one mobile relay robot.

Furthermore, according to the robot operating method and the robot operating system of the present embodiment, the number of mobile relay robots to be put in is set not only based on a longest distance between the host device and the task robot but also according to an environment of the task execution region.

For example, the number of the mobile relay robots to be put in may be set based on a ratio of the longest distance to an effective communication radius of one mobile relay robot, and the effective communication radius of the mobile relay robot may be applied after being calibrated according to the environment of the task execution region.

Accordingly, as the number of a plurality of mobile relay robots may be appropriately calculated in a new task execution region, the mobile relay robots may be placed quickly at appropriate positions.

BEST MODE

The description below and the attached drawings are provided to gain understanding of operations according to the present disclosure. Description of elements or operations which may be easily implemented by one of ordinary skill in the art may be omitted.

The description and the drawings are not provided for limitation, and the scope of the present disclosure should be defined by the appended claims. The meaning of the terms used in the present specification and claims of the present disclosure should be construed as meanings and concepts not departing from the spirit and scope of the present disclosure based on the principle that the inventor is capable of defining concepts of terms in order to describe his or her invention in the most appropriate way.

Hereinafter, embodiments of the present disclosure will be described with reference to the attached drawings.

Figure 2:
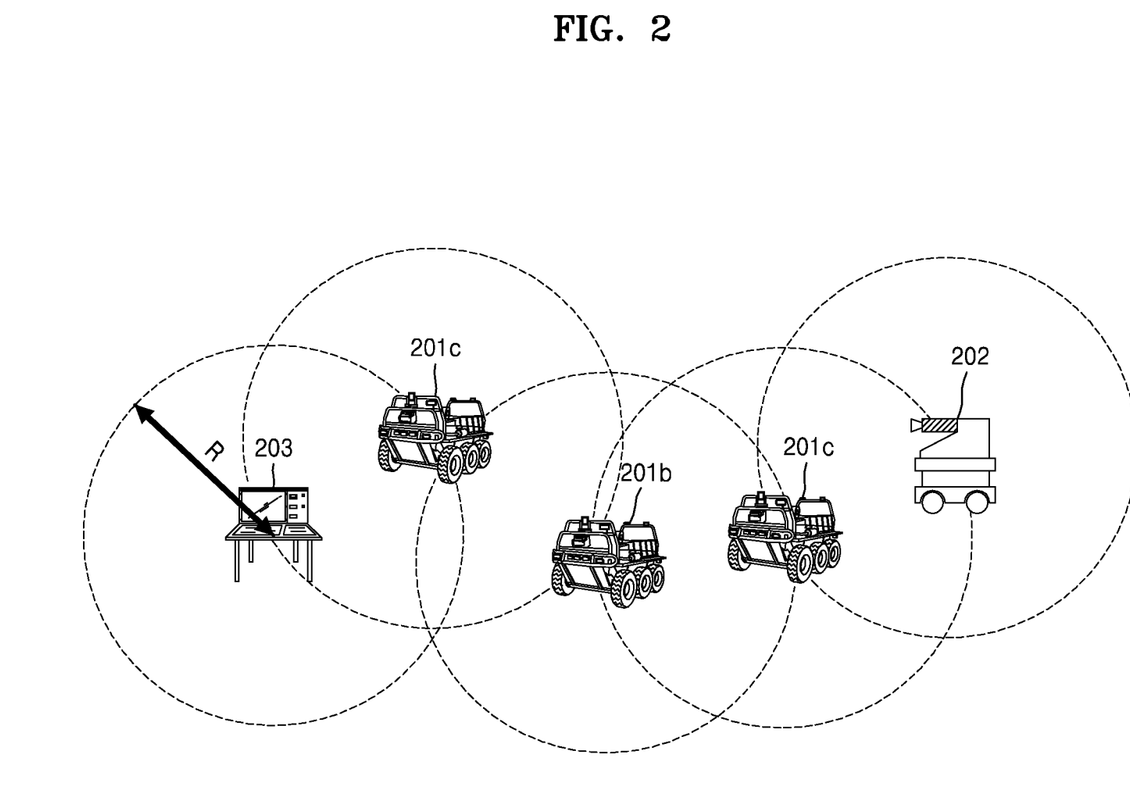
FIG. 2 is a diagram illustrating a robot operating system in which a method according to an embodiment of the present disclosure is adopted.

FIG. 2 is a diagram illustrating a robot operating system in which a method according to an embodiment of the present disclosure is adopted. In FIG. 2, reference symbol R denotes an effective communication distance of a host device 203.

Referring to FIG. 2, the robot operating system in which the method according to the present embodiment is adopted includes the host device 203, a task robot 202, and at least one mobile relay robot (201a through 201c).

The task robot 202 performs a task by performing wireless communication with the host device 203 in a designated task execution region.

The mobile relay robots 201a through 201c are put in between the host device 203 and the task robot 202 to relay communication between the host device 203 and the task robot 202. That is, the mobile relay robots 201a through 201c perform a function of repeaters according to the related art. Accordingly, following effects are obtained.

First, installation of repeaters is completed by the host device 203 as the host device 203 controls the mobile relay robots 201a through 201c, and thus, installation of repeaters may be performed conveniently.

Secondly, as the mobile relay robots 201a through 201c may be respectively installed at appropriate positions, communication between the host device 203 and the task robot 202 is not disconnected.

Thirdly, when a travel path of the task robot 202 is changed in a same task execution region, the repeaters may be reinstalled conveniently by changing the positions of the mobile relay robots 201a through 201c.

Furthermore, the number of the mobile relay robots 201a through 201c to be put in between the host device 203 and the task robot 202 is set not only based on a longest distance between the host device 203 and the task robot 202 but also according to an environment of the task execution region.

For example, the number of the mobile relay robots 201a through 201c to be put in may be set based on a ratio of the longest distance to an effective communication radius of one mobile relay robot, and the effective communication radius of the mobile relay robot may be applied after being calibrated according to the environment of the task execution region.

Accordingly, as the number of the plurality of mobile relay robots 201a through 201c in a new task execution region may be calculated appropriately, the mobile relay robots 201a through 201c may be placed quickly at appropriate positions.

Figure 3:
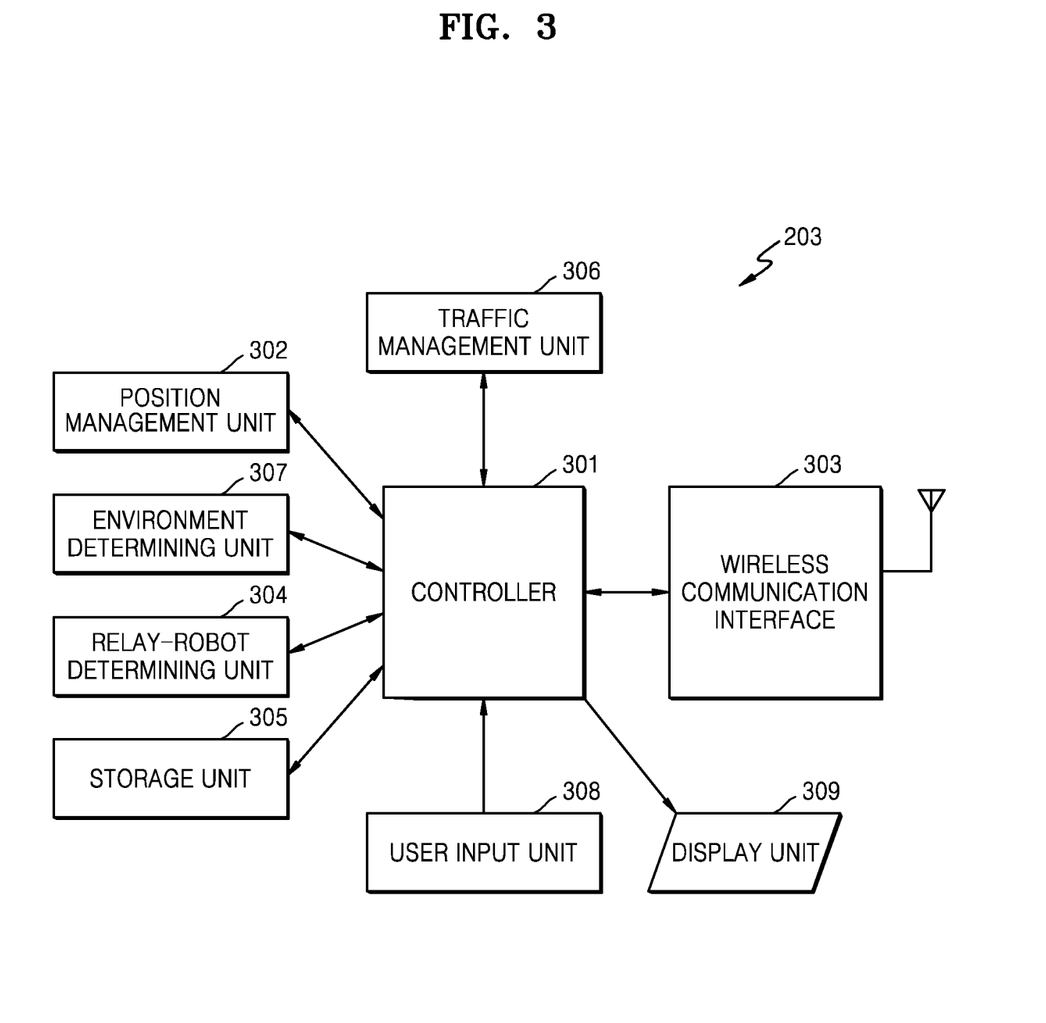
FIG. 3 is a diagram illustrating a configuration of a host device in FIG. 2.

FIG. 3 is a diagram illustrating a configuration of the host device 203 in FIG. 2. A configuration and operation of the host device 203 will be described with reference to FIGS. 2 and 3.

The host device 203 includes a controller 301, a position management unit 302, a wireless communication interface 303, a relay-robot determining unit 304, a storage unit 305, a traffic management unit 306, an environment determining unit 307, a user input unit 308, and a display unit 309.

The controller 301 controls operation of each component overall, and operates the mobile relay robots 201a through 201c and the task robot 202. An operating process of the controller 301 will be described in detail with reference to FIGS. 6 through 11.

The position management unit 302 including a global positioning system (GPS) receiver provides the controller 301 with current position information. An operation of the position management unit 302 as above is required when the host device 203 moves to a new task execution region with the mobile relay robots 201a through 201c and the task robot 202.

The wireless communication interface 303 operates when the controller 301 communicates with the task robot 202 via the mobile relay robots 201a through 201c.

The relay-robot determining unit 304 operated by the controller 301 determines the number of mobile relay robots to be put in to a new task execution region.

The storage unit 305 stores various types of data from the controller 301.

The traffic management unit 306 operated by the controller 301 monitors RSSI (Received Signal Strength Indication) of the mobile relay robots 201a through 201c and the task robot 202.

The environment determining unit 307 including various sensors provides the controller 301 with surrounding environment information.

The user input unit 308 inputs a user command or setting signals to the controller 301.

The display unit 309 displays captured images from the task robot 202 and output data from the controller 301.

Figure 4:
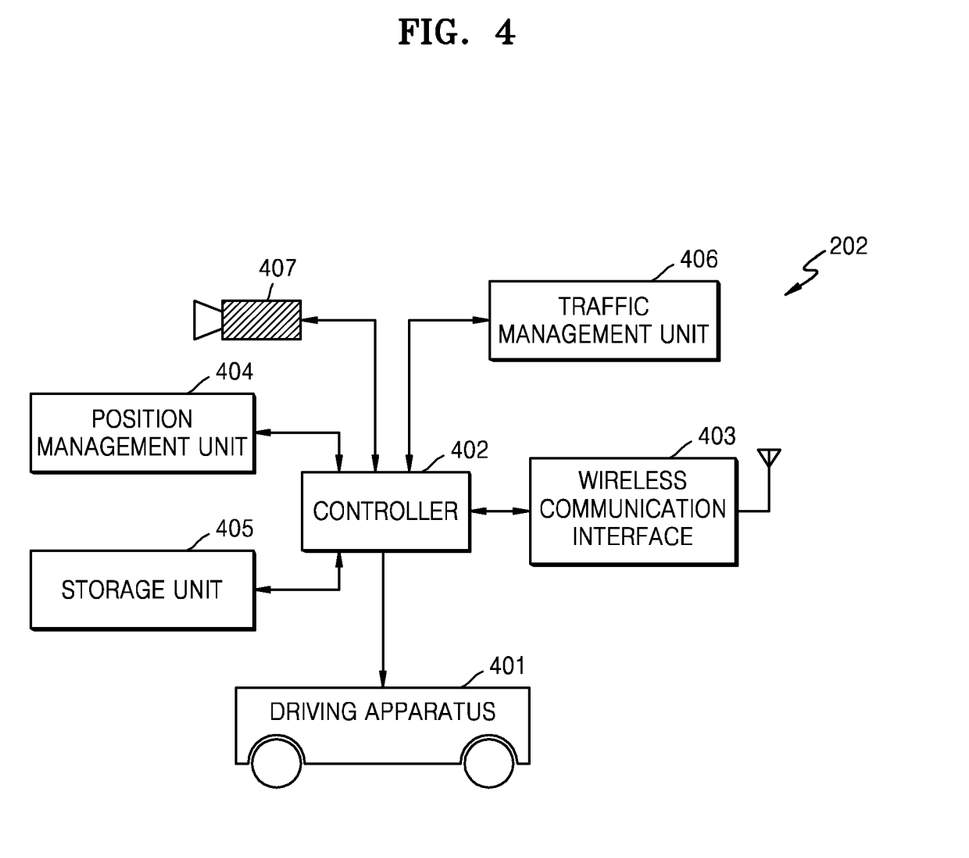
FIG. 4 is a diagram illustrating a configuration of a task robot in FIG. 2.

FIG. 4 is a diagram illustrating a configuration of the task robot 202 in FIG. 2. A configuration and operation of the task robot 202 will be described with reference to FIGS. 2 and 4.

The task robot 202 includes a driving apparatus 401, a controller 402, a wireless communication interface 403, a position management unit 404, a storage unit 405, a traffic management unit 406, and a camera 407.

The driving apparatus 401 operated by the controller 402 moves a main body thereof while performing a task.

The controller 402 controls operation of each component overall.

The wireless communication interface 403 operates when the controller 402 communicates with the host device 230 via the mobile relay robots 201a through 201c.

The position management unit 404 including a global positioning system (GPS) receiver provides the controller 402 with current position information.

The storage unit 405 stores various types of data from the controller 402.

The traffic management unit 406 operated by the controller 402 monitors RSSI (Received Signal Strength Indication) of the mobile relay robots 201a through 201c and the task robot 202.

The camera 407 operated by the controller 402 captures images while performing panning and tilting. The controller 402 transmits, to the host device 203, recorded videos from the camera 407 via the wireless communication interface 403 and the mobile relay robots 201a through 201c.

Figure 5:
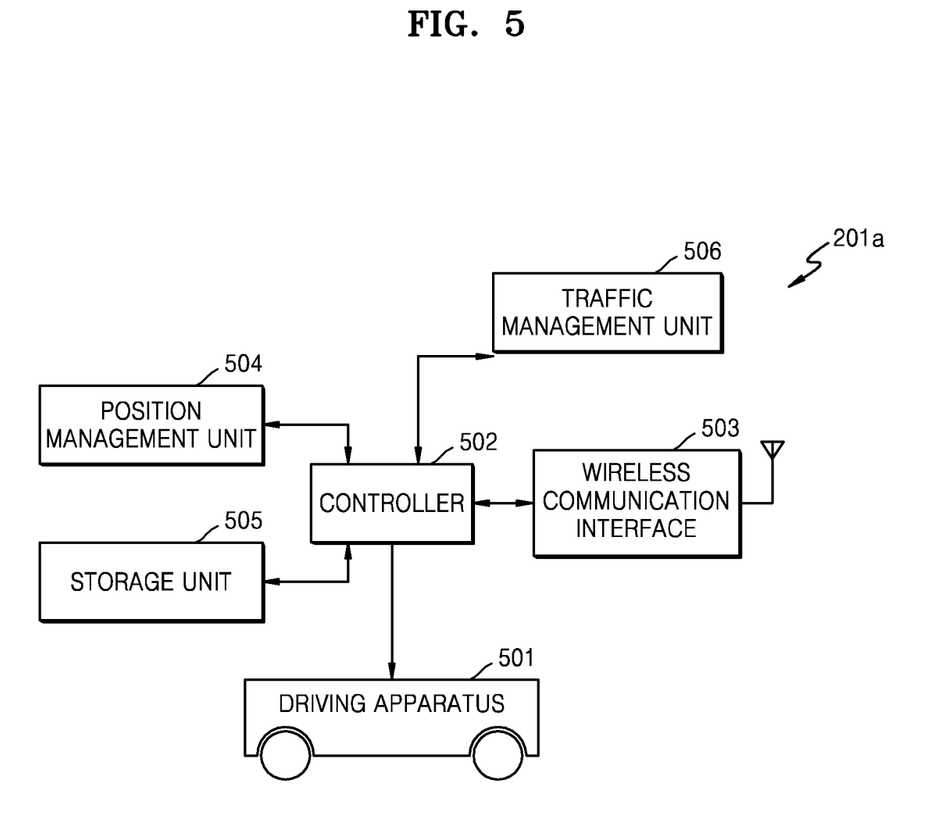
FIG. 5 is a diagram illustrating a configuration of a mobile relay robot in FIG. 2.

FIG. 5 is a diagram illustrating a configuration of a mobile relay robot (for example, 201a) in FIG. 2. A configuration and operation of the mobile relay robot 201a will be described with reference to FIGS. 2 and 5.

The mobile relay robot 201a includes a driving apparatus 501, a controller 502, a wireless communication interface 503, a position management unit 504, a storage unit 505, and a traffic management unit 506.

The driving apparatus 501 operated by the controller 502 moves a main body thereof.

The controller 502 controls operation of each component overall.

The wireless communication interface 503 operates when the controller 502 communicates with communication objects on both sides, for example, with two mobile relay robots or with the host device 203 and a mobile relay robot or with the task robot 202 and a mobile relay robot.

The position management unit 504 including a GPS receiver provides the controller 502 with current position information.

The storage unit 505 stores various types of data from the controller 502.

The traffic management unit 506 operated by the controller 502 monitors RSSI (Received Signal Strength Indication) of a signal received from communication objects on both sides, for example, two mobile relay robots, or the host device 203 and a mobile relay robot, or the task robot 202 and a mobile relay robot.

Figure 6A:
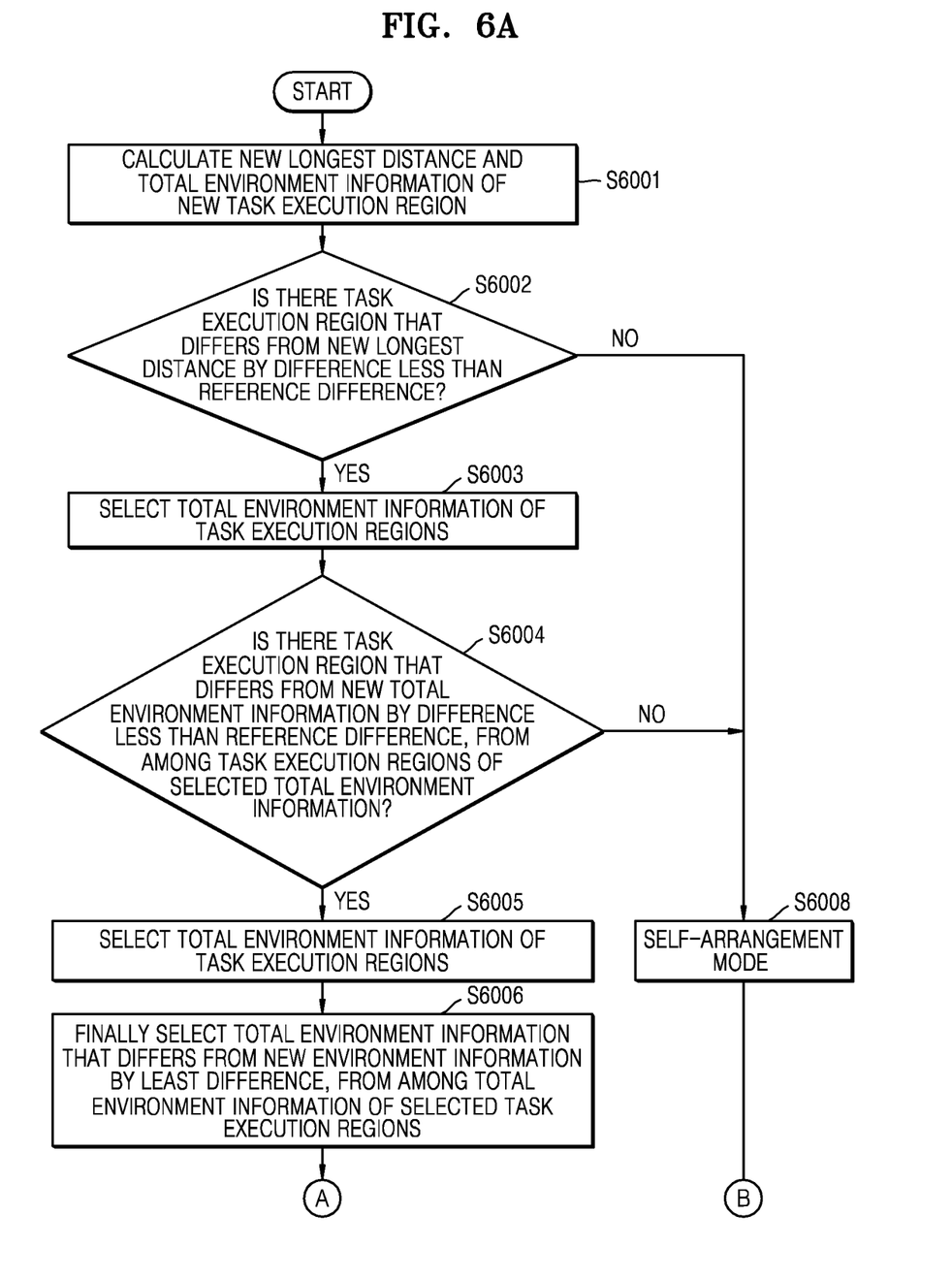
FIG. 6 is a flowchart of operation of a controller in FIG. 3.
Figure 6B:
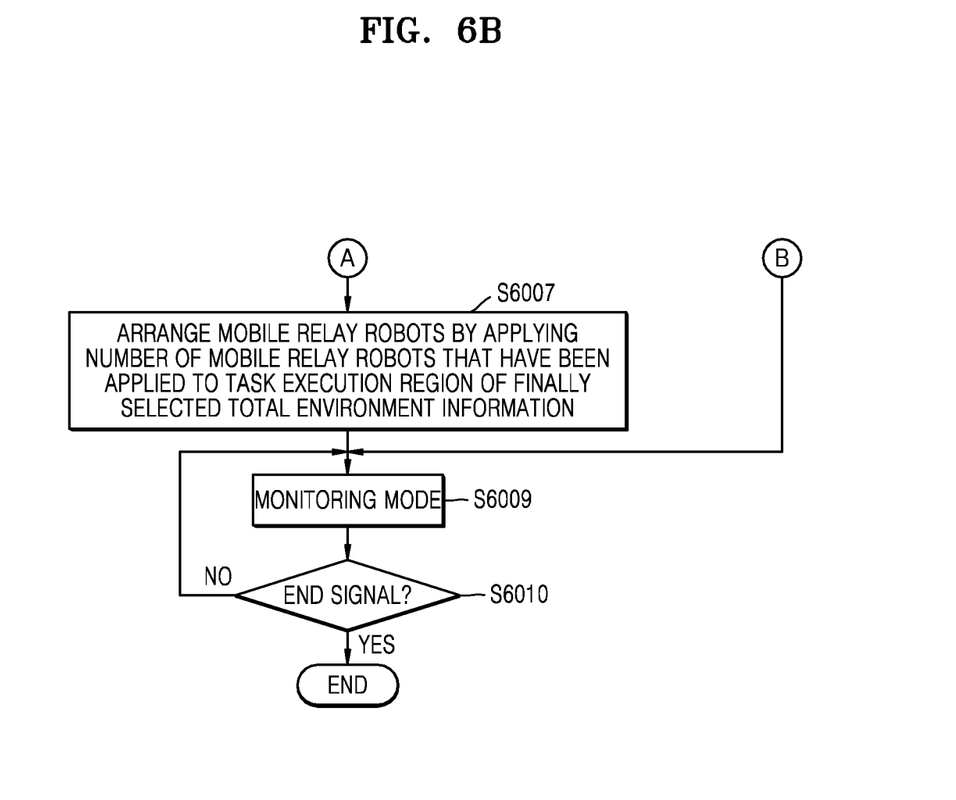

FIG. 6 illustrates an operation of the controller 301 in FIG. 3. The operation of FIG. 6 is an operation performed to arrange the mobile relay robots 201a through 201c (FIG. 2) after the host device 203 (FIG. 2) is installed in a new task execution region. When the arrangement of the mobile relay robots 201a through 201c is completed, the task robot 202 (FIG. 2) performs a task while communicating with the host device 203 via the mobile relay robots 201a through 201c.

Figure 7:
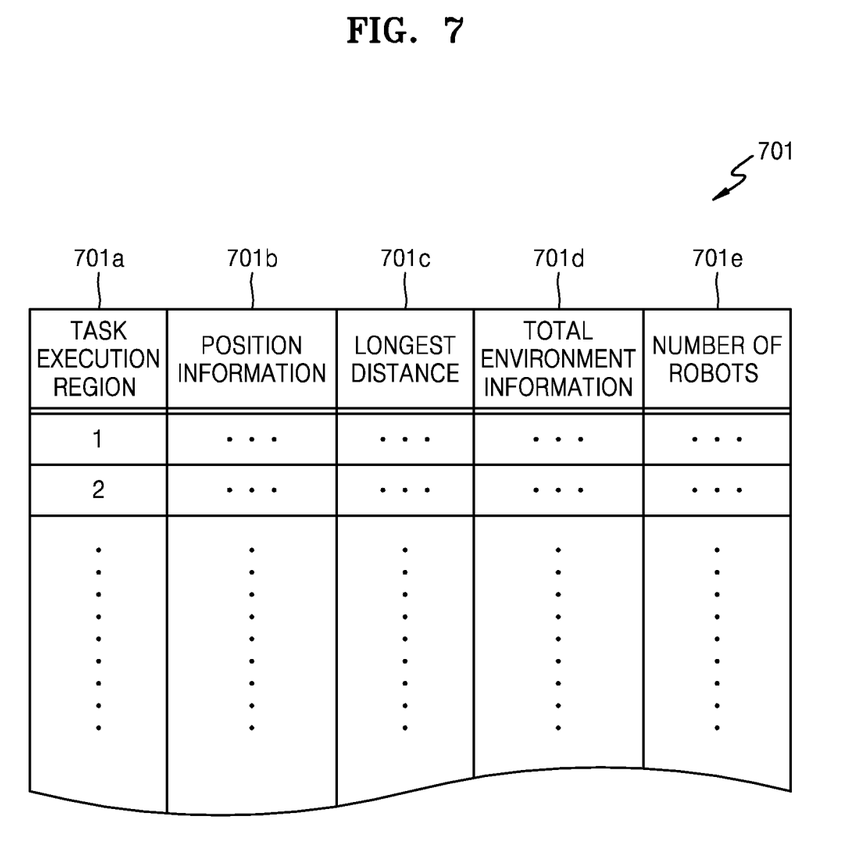
FIG. 7 is a diagram for describing a task execution record table that is updated and stored in a storage unit in FIG. 3.

FIG. 7 is a diagram for describing a task execution record table 701 that is updated and stored in the storage unit 305 in FIG. 3. Referring to FIG. 7, for each of task execution regions 701a of the past, position information 701b, longest distance 701c, total environment information 701d, and the number of robots 701e are stored. Hereinafter, the longest distance 701c refers to a longest distance between the host device 203 and the task robot 202. The total environment information 701d refers to the total and accumulated average environment information of the task execution region 701a. The total environment information 701d of any one task execution region 701a includes height H, season, weather, and whether line of sight (LOS) is applied (see FIG. 9). The number of robots 701e refers to the number of mobile relay robots 201a through 201c that has been applied.

An operation of the controller 301 of the host device 203 will be described with reference to FIGS. 2, 3, 6, and 7.

The controller 301 calculates a new longest distance according to a set distance from the user input unit 308, and calculates total environment information of a new task execution region according to information from the environment determining unit 307 (operation S6001).

The controller 301 determines, by referring to the task execution record table 701, whether there is a task execution region that differs from the new longest distance by a difference less than a reference difference, from among the longest distances 701c stored for each task execution region 701a (operation S6002).

When there is no task execution region that differs from the new longest distance by a difference less than the reference difference, the controller 301 performs a self-arrangement mode (operation S6008). The self-arrangement mode (operation S6008) will be described in detail with reference to FIGS. 8 and 9.

When there is a task execution region that differs from the new longest distance by a difference less than the reference difference, the controller 301 performs a history-use arrangement mode of operations S6003 through S6007. In the task execution record table 701, the number of robots 701e is the number of the mobile relay robots 201a through 201c that have been successfully applied in the past. Thus, the number of robots according to the history-use arrangement mode (operations S6003 through S6007) may be more appropriate and accurate than the number of robots according to the self-arrangement mode (operation S6008).

In operation S6003, the controller 301 selects the total environment information 701d of task execution regions that differs from the new longest distance by a difference less than a reference difference.

Next, the controller 301 determines whether there is a task execution region that differs from new total environment information by a difference less than a reference difference, from among the total environment information 701d of the selected task execution regions (operation S6004).

When there is no task execution region that differs from the new total environment information by a difference less than the reference difference, the controller 301 performs a self-arrangement mode (operation S6008).

In operation S6005, the controller 301 selects the total environment information 701d of task execution regions that differ from new total environment information by a difference less than the reference difference.

Next, the controller 301 finally selects total environment information that differs from new environment information by a least difference, from among the total environment information 701d of the selected task execution regions (operation S6006).

Also, the controller 301 arranges mobile relay robots by applying the number of the mobile relay robots 201a through 201c that have been applied to a task execution region of the finally selected total environment information (operation S6007).

For example, the mobile relay robots 201a through 201c are put in at positions where they maintain a mutually equal distance between each other on a travel path between the host device 203 and the task robot 202.

When the arrangement of the mobile relay robots 201a through 201c is completed, the task robot 202 performs a task while communicating with the host device 203 via the mobile relay robots 201a through 201c. Accordingly, the controller 301 performs a monitoring mode (operation S6009). The monitoring mode (operation S6009) will be described in detail with reference to FIGS. 10 and 11. The monitoring mode (operation S6009) is repeatedly performed until an end signal is generated (operation S6010).

Figure 8:
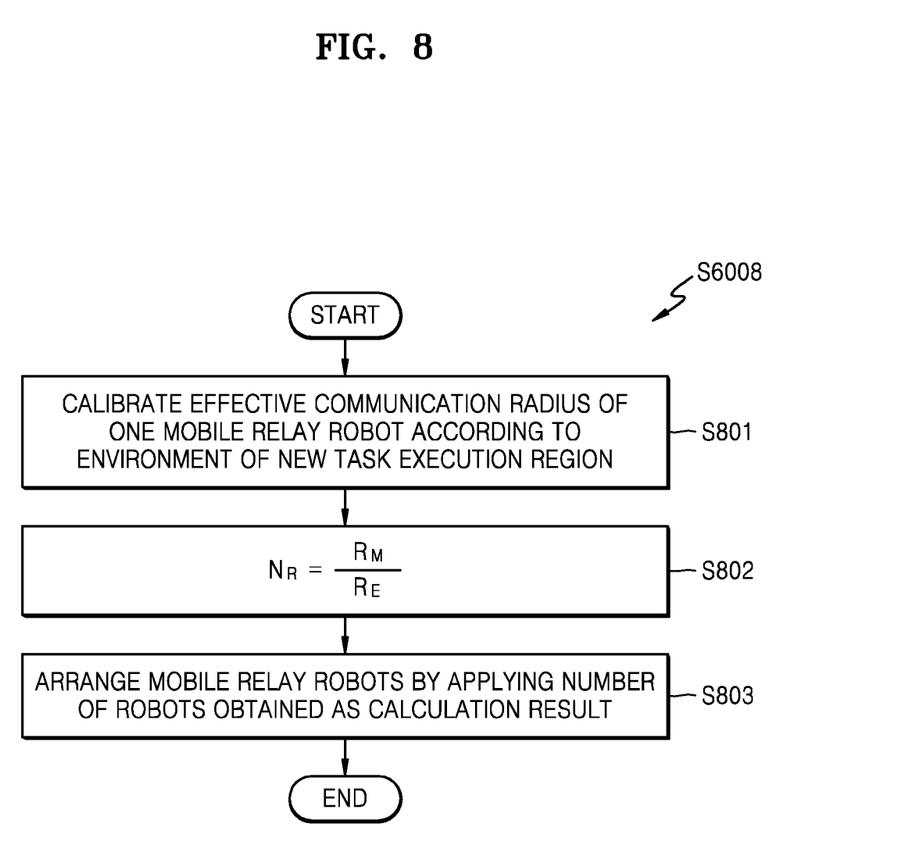
FIG. 8 is a flowchart of specific operations of a self-arrangement mode (S6008) in FIG. 6.

FIG. 8 is a flowchart of specific operations of a self-arrangement mode (S6008) in FIG. 6. Specific operations of the self-arrangement mode (S6008) will be described with reference to FIGS. 2, 3, and 8.

The controller 301 of the host device 203 calibrates an effective communication radius of one mobile relay robot (each of the mobile relay robots 201a through 201c) according to an environment of a new task execution region (operation S801). The calibration operation (S801) will be described in detail with reference to FIG. 9.

Next, the controller 301 sets the number of mobile relay robots to be put in (operation S802). Here, the number of robots is set based on a ratio of the longest distance to an effective communication radius of one mobile relay robot (each of the mobile relay robots 201a through 201c). When a number of mobile relay robots to be put in is NR, the longest distance is RM, and an effective communication radius after calibration is RM, the number of mobile relay robots is set according to Equation 1 below.

$$N_R = \frac{R_M}{R_E}$$ [Equation 1]

Also, the controller 301 arranges the mobile relay robots by applying the number of robots obtained as a calculation result (operation S803).

Figure 9:
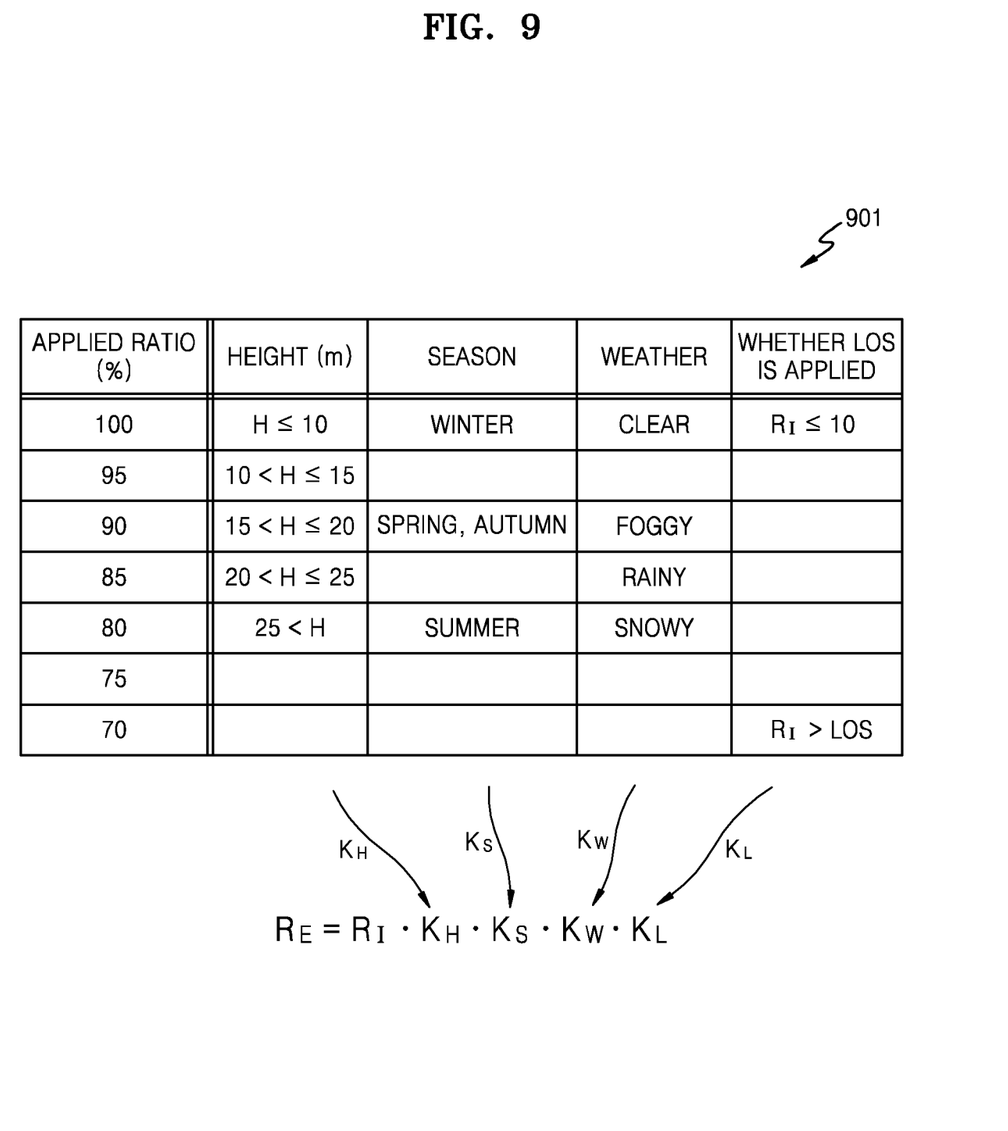
FIG. 9 illustrates a look-up table used in calibrating an effective communication radius in operation S801 of FIG. 8.

FIG. 9 illustrates a look-up table 901 used in calibrating an effective communication radius in operation S801 of FIG. 8. In FIG. 9, reference symbol RI denotes a previous effective communication radius before calibration is performed.

Referring to FIG. 9, an environment of a task execution region includes a height H, season, weather, and whether line of sight (LOS) is applied.

An effective communication radius RE is shorter, the higher the height H and the warmer the season. When the effective communication radius RI is longer than a LOS (Line Of Sight) distance, the effective communication radius RE is reduced.

Regarding the effective communication radius RE, an effective communication radius in foggy weather is shorter than that in clear weather. Also, regarding the effective communication radius RE, an effective communication radius in highly rainy weather is shorter than that in highly foggy weather. Also, regarding the effective communication radius RE, an effective communication radius in heavily snowy weather is shorter than that in highly rainy weather.

When a previous effective communication radius before calibration is RI; a calibration ratio according to a height H is KH; a calibration ratio according to season is KS; a calibration ratio according to weather is KW; and a calibration ratio according to whether LOS is applied is KL, an effective communication radius RE is calculated according to Equation 2 below.

$$R_E = R_I \times K_H \times K_S \times K_W \times K_L$$ [Equation 2]

Obviously, other equations than Equation 2 above may also be used according to circumstances.

Figure 10A:
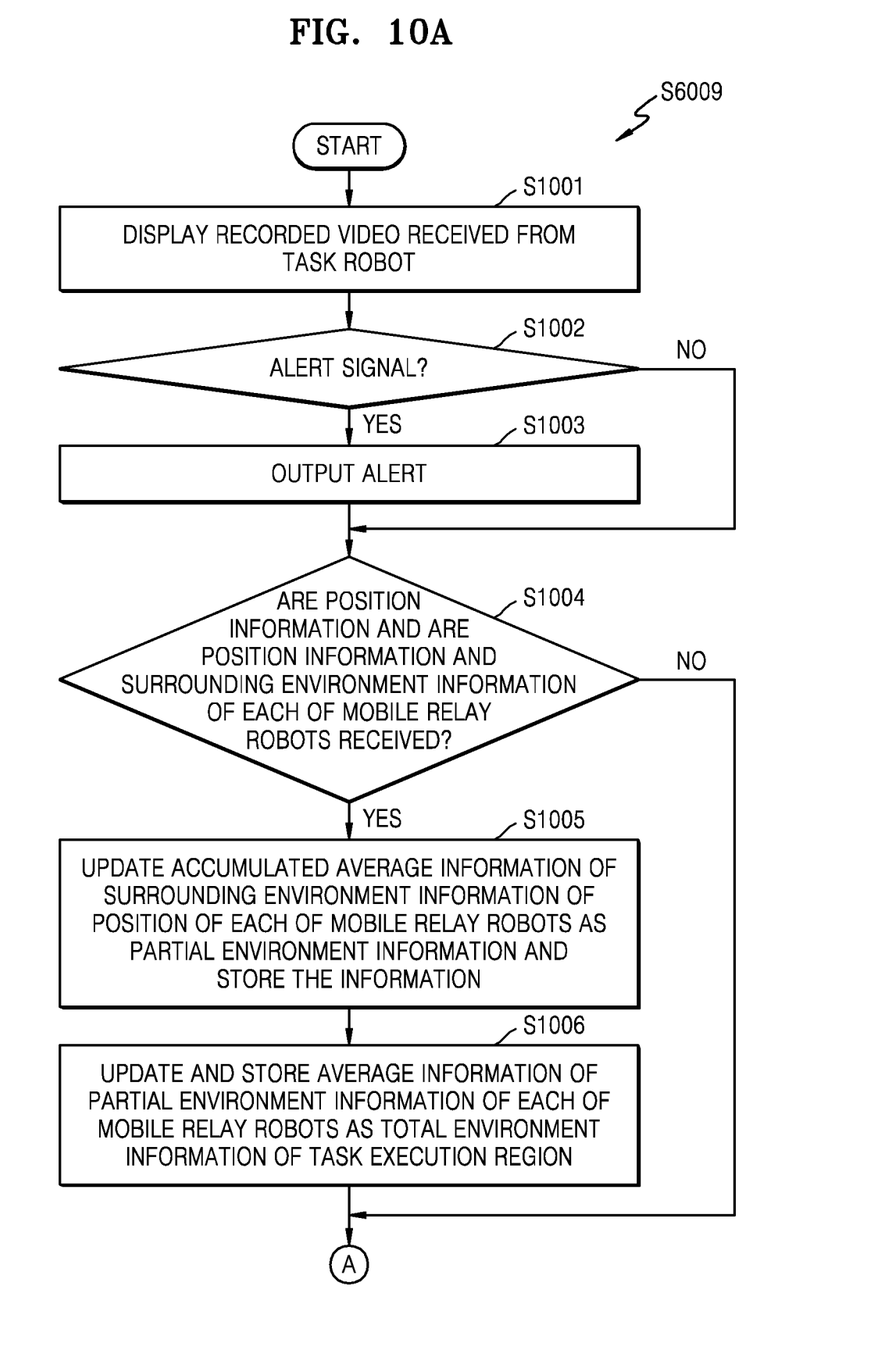
FIG. 10 is a flowchart of specific operations of a monitoring mode (S6009) in FIG. 6.
Figure 10B:
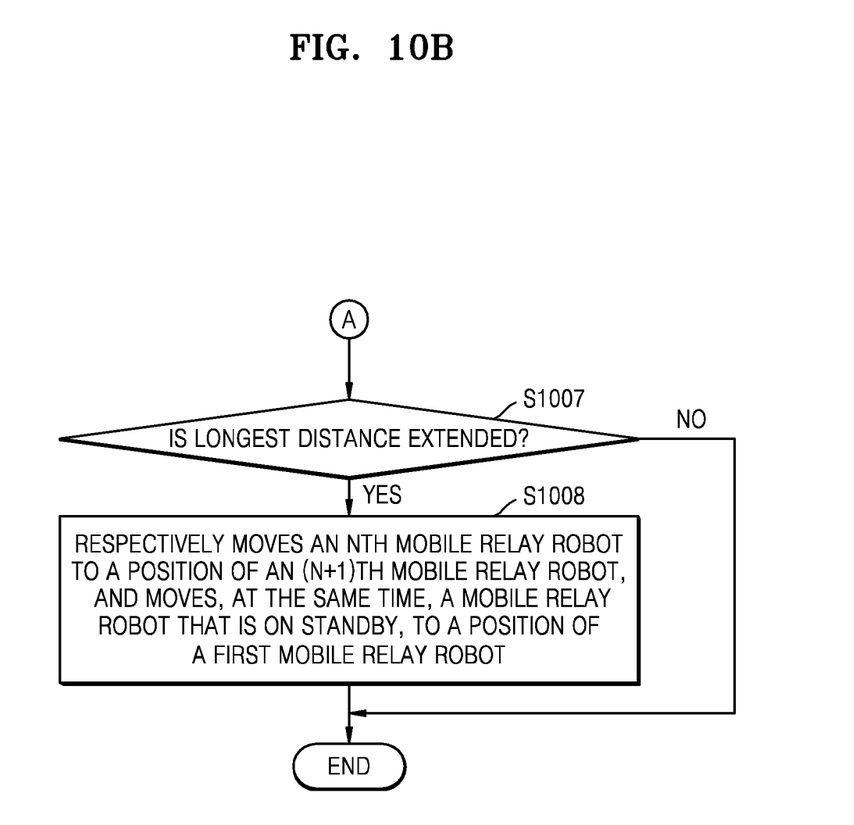

FIG. 10 is a flowchart of specific operations of the monitoring mode in FIG. 6 (S6009). Here, each of the mobile relay robots 201a through 201c (FIG. 2) put in between the host device 203 (FIG. 2) and the task robot 202 (FIG. 2) periodically transmits its position information and surrounding environment information to the host device 203. The specific operations of the monitoring mode (S6009) in FIG. 6 will be described with reference to FIGS. 2, 3, and 10.

The controller 301 of the host device 203 displays a recorded video received from the task robot 202 on the display unit 309 (operation S1001).

When an alert signal is received from the task robot 202 via the mobile relay robots 201a through 201c and the wireless communication interface 303 (operation S1002), the controller 301 outputs an alert (operation S1003).

When position information and surrounding environment information of each of the put-in mobile relay robots 201a through 201c are received (operation S1004), the controller 301 updates accumulated average information of the surrounding environment information of the position of each of the mobile relay robots 201a through 201c as partial environment information and stores the same (operation S1005). The partial environment information as described above may be utilized later as specific record information.

Also, the controller 301 updates and stores average information of the partial environment information of each of the mobile relay robots 201a through 201c as total environment information (701d of FIG. 7) of the task execution region (operation S1006).

When a longest distance is extended according to a reset command from the user input unit 308 (operation S1007), the controller 301 respectively moves an nth mobile relay robot to a position of an (n+1)th mobile relay robot, and moves, at the same time, a mobile relay robot that is on standby, to a position of a first mobile relay robot (operation S1008).

Figure 11:
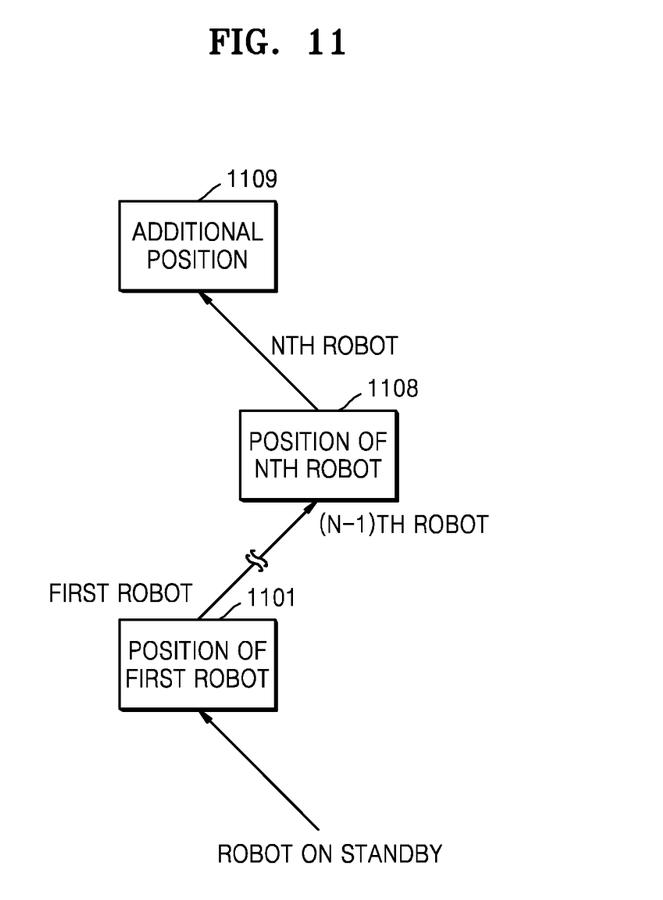
FIG. 11 is a diagram for describing a manner in which mobile relay robots are moved in operation S1008 of FIG. 10.

FIG. 11 is a diagram for describing a manner in which the mobile relay robots are moved in operation S1008 of FIG. 10.

Referring to FIG. 11, an nth mobile relay robot is moved to an additional position 1109. An (n−1)th mobile relay robot is moved to a position 1108 of the nth mobile relay robot. A first mobile relay robot is moved to a position of a second mobile relay robot. A mobile relay robot that is on standby is moved to a position of the first mobile relay robot.

According to an additional put-in method as illustrated in FIG. 11, additional put-in may be performed while communication is not interrupted.

As described above, according to the robot operating method and robot operating system of the present embodiment, a mobile relay robot performs a function of a relay device according to the related art. Thus, following effects are obtained.

First, installation of a repeater is completed by a host device as the host device controls at least one mobile relay robot, and thus, the repeater may be installed conveniently.

Secondly, as at least one mobile relay robot may be installed at an appropriate position, communication between a host device and a task robot is not disconnected.

Thirdly, when a travel path of a task robot is changed within a same task execution region, a repeater may be conveniently reinstalled by moving a position of at least one mobile relay robot.

Furthermore, according to the robot operating method and the robot operating system of the present embodiment, the number of mobile relay robots to be put in is set not only based on a longest distance between a host device and a task robot but also according to an environment of a task execution region.

For example, the number of mobile relay robots to be put in may be set based on a ratio of a longest distance to an effective communication radius of one mobile relay robot, and an effective communication radius of a mobile relay robot may be applied after being calibrated according to the environment of the task execution region.

Accordingly, as the number of a plurality of mobile relay robots may be appropriately calculated in a new task execution region, the mobile relay robots may be placed quickly at appropriate positions.

While the present disclosure has been particularly shown and described with reference to exemplary embodiments thereof, it will be understood by those of ordinary skill in the art that various changes in form and details may be made therein without departing from the spirit and scope of the present disclosure as defined by the appended claims. The exemplary embodiments should be considered in descriptive sense only and not for purposes of limitation. Therefore, the scope of the present disclosure is defined not by the detailed description of the present disclosure but by the appended claims, and all differences within the scope will be construed as being included in the present disclosure.

MODE OF DISCLOSURE

No additional embodiment is provided.

INDUSTRIAL APPLICABILITY

The present disclosure may be used in various robot operating systems.

SEQUENCE LISTING FREE TEXT

None.

The invention claimed is:

1. A robot operating method in which a host device operates a task robot which performs a task by performing wireless communication with the host device in a designated task execution region,
   wherein at least one mobile relay robot that relays communication between the host device and the task robot is put in between the host device and the task robot,
   wherein a number of mobile relay robots to be put in between the host device and the task robot is set according to a longest distance between the host device and the task robot and an environment of the task execution region,
   wherein each of the mobile relay robots put in between the host device and the task robot periodically transmits its position information and surrounding environment information to the host device,
   wherein the host device that periodically receives the surrounding environment information from the mobile relay robots updates and stores accumulated average information of the surrounding environment information of the position of each of the mobile relay robots as partial environment information,
   wherein average information of the partial environment information of each of the mobile relay robots is updated and stored as total environment information of the task execution region,
   wherein information about a longest distance between the host device and the task robot is stored for each task execution region, and
   wherein when the task execution region is newly designated,
   total environment information of task execution regions that differ from a new longest distance by a difference less than a reference difference, from among the longest distances stored for each of the task execution region, is selected;
   total environment information that differs from new environment information by a least difference, from among the selected total environment information of the task execution regions, is finally selected; and
   mobile relay robots are arranged by applying the number of mobile relay robots that have been applied to a task execution region of the finally selected total environment information.

2. A robot operating system comprising:
   a host device; and
   a task robot performing a task while performing wireless communication with the host device in a designated task execution region,
   wherein the robot operating system further comprises at least one mobile relay robot that is put in between the host device and the task robot, and relays communication between the host device and the task robot, and
   wherein a number of mobile relay robots to be put in between the host device and the task robot is set according to a longest distance between the host device and the task robot and an environment of the task execution region,
   wherein each of the mobile relay robots put in between the host device and the task robot periodically transmits its position information and surrounding environment information to the host device,
   wherein the host device that periodically receives the surrounding environment information from the mobile relay robots updates and stores accumulated average information of the surrounding environment information of the position of each of the mobile relay robots as partial environment information,
   wherein the host device updates and stores average information of the partial environment information of each of the mobile relay robots as total environment information of the task execution region,
   wherein the host device stores information about a longest distance between the host device and the task robot each of the task execution region, and
   wherein when the task execution region is newly designated, the host device
   selects total environment information of task execution regions that differ from a new longest distance by a difference less than a reference difference, from among the longest distances stored for each of the task execution region;
   finally selects total environment information that differs from new environment information by a least difference, from among the selected total environment information of the task execution regions; and
   arranges mobile relay robots by applying the number of mobile relay robots that have been applied to a task execution region of the finally selected total environment information.

* * * * *